(12) United States Patent
Santos

(10) Patent No.: US 10,096,140 B2
(45) Date of Patent: Oct. 9, 2018

(54) APPARATUS AND METHOD FOR PROCESSING DATA

(71) Applicant: SAMSUNG ELECTRONICS CO., LTD., Suwon-si (KR)

(72) Inventor: Francisco Santos, Staines (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 56 days.

(21) Appl. No.: 14/854,824

(22) Filed: Sep. 15, 2015

(65) Prior Publication Data
US 2016/0078658 A1 Mar. 17, 2016

(30) Foreign Application Priority Data

Sep. 15, 2014 (GB) .................................. 1416275.4
Jul. 13, 2015 (KR) ........................ 10-2015-0099218

(51) Int. Cl.
G06T 11/60 (2006.01)
G06T 3/40 (2006.01)
G06F 3/0481 (2013.01)
G09G 5/36 (2006.01)

(52) U.S. Cl.
CPC ............ G06T 11/60 (2013.01); G06F 3/0481 (2013.01); G06T 3/40 (2013.01); G09G 5/363 (2013.01); G09G 2340/0492 (2013.01)

(58) Field of Classification Search
None
See application file for complete search history.

(56) References Cited

U.S. PATENT DOCUMENTS 6,993,461 B1   1/2006  Boussac et al.
7,190,284 B1 * 3/2007  Dye ...................... G06F 12/023
                                                     341/51
(Continued)

FOREIGN PATENT DOCUMENTS

CN   101860721 A   10/2010
CN   101996045 A    3/2011
(Continued)

OTHER PUBLICATIONS

Green, "Improved Alpha-Tested Magnification for Vector Textures and Special Effects", ACM SIGGRAPH 2007 Courses, Jan. 2007, 5 pages total.
(Continued)

Primary Examiner — Tize Ma
(74) Attorney, Agent, or Firm — Sughrue Mion, PLLC

(57) ABSTRACT

A method of rendering an image in a display apparatus includes acquiring information about a repeated shape that represents at least a part of one or more geometric shapes included in the image and repeatedly occurs in the one or more geometric shapes; acquiring rendering information representing a method of rendering the one or more geometric shapes based on the information about the repeated shape; and rendering the one or more geometric shapes based on the information about the repeated shape and the rendering information.

16 Claims, 18 Drawing Sheets

(56) References Cited

U.S. PATENT DOCUMENTS

| | | | |
|---|---|---|---|
| 8,347,332 | B2 | 1/2013 | Fukuda et al. |
| 9,002,121 | B2 | 4/2015 | Cai et al. |
| 9,378,587 | B2 | 6/2016 | Xu et al. |
| 2004/0189642 | A1 | 9/2004 | Frisken et al. |
| 2005/0144134 | A1 | 6/2005 | Hirano |
| 2008/0068383 | A1 | 3/2008 | Dowling |
| 2013/0045799 | A1* | 2/2013 | Soelberg ............... A63F 13/95 463/31 |
| 2013/0084026 | A1 | 4/2013 | Kigure |
| 2013/0185028 | A1 | 7/2013 | Sullivan |
| 2014/0307806 | A1 | 10/2014 | Suh et al. |
| 2014/0334717 | A1* | 11/2014 | Jiang ..................... G06T 9/001 382/154 |

FOREIGN PATENT DOCUMENTS

| | | | | |
|---|---|---|---|---|
| CN | 102415101 | A | 4/2012 | |
| WO | 2012/040883 | A1 | 4/2012 | |
| WO | WO 2013107273 | A1 * | 7/2013 | ............ G06T 15/04 |
| WO | 2014/003736 | A1 | 1/2014 | |

OTHER PUBLICATIONS

Wu, et al.; "GPU-Based Feature-Preserving Distance Field Computation", International Conference on Cyberworlds 2008, Sep. 2008, 6 pages total.

Gustavson, "Beyond the Pixel: Towards the Infinite Resolution Textures", Linkoping University, ITN Internal Report, Feb. 16, 2006, 5 pages total.

Frisken, et al.; "Adaptively Sampled Distance Fields: A General Representation of Shape for Computer Graphics", Mitsubishi Electric Research Laboratories Cambridge Research Center, Apr. 2000, 7 pages total.

Communication dated Mar. 9, 2015, issued by the Intellectual Property Office of the United Kingdom in counterpart British Patent Application No. GB1416275.4.

Communication dated Nov. 28, 2017, issued by the State Intellectual Property Office of P.R. China in counterpart Chinese application No. 201510587199.7.

Communication dated Apr. 12, 2018 by the European Patent Office in counterpart European Patent Application No. 15185064.1.

* cited by examiner

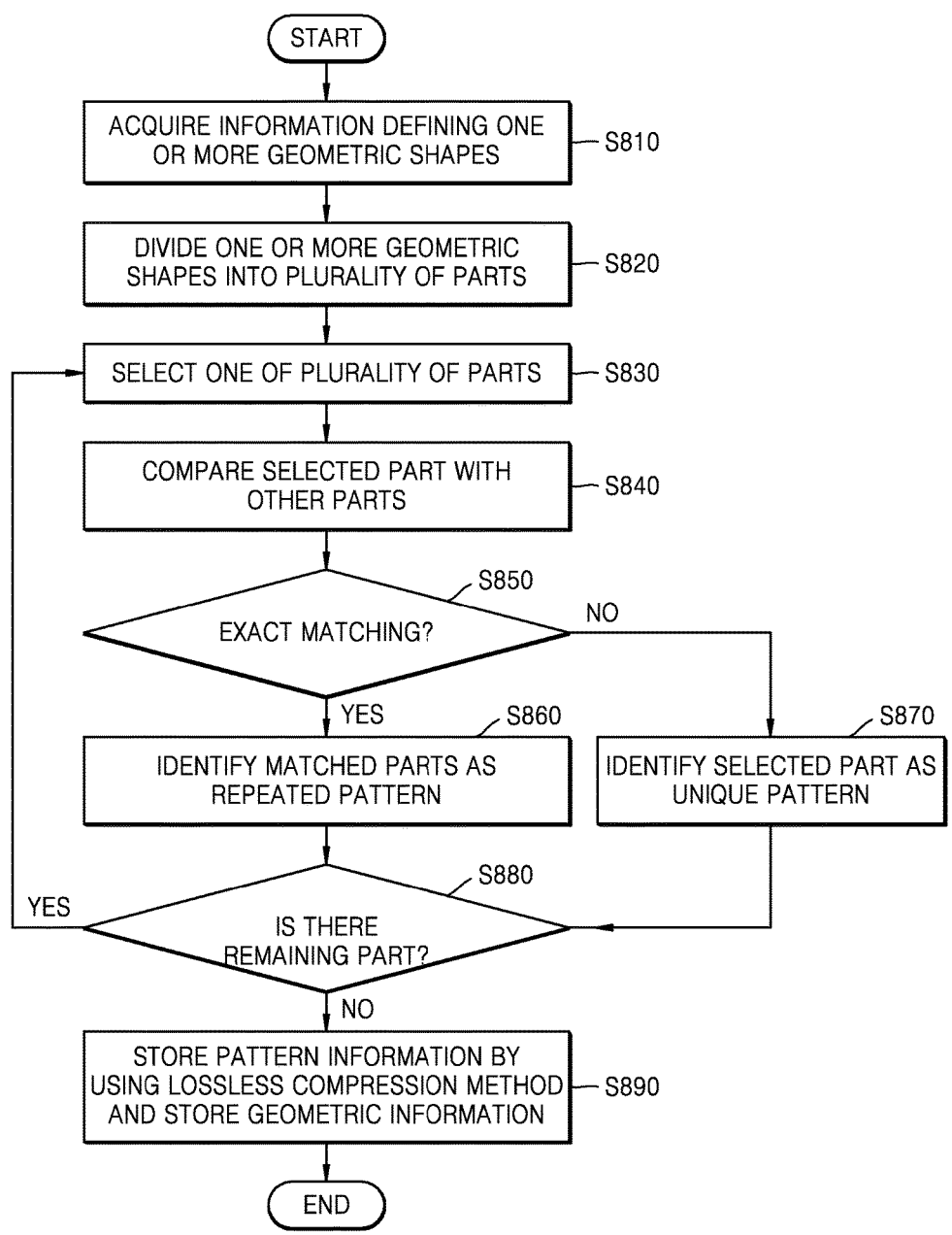

APPARATUS AND METHOD FOR PROCESSING DATA

CROSS-REFERENCE TO RELATED APPLICATIONS

This application claims priorities from British Patent Application No. 1416275.4, filed on Sep. 15, 2014, in the British Intellectual Property Office, and Korean Patent Application No. 10-2015-0099218, filed on Jul. 13, 2015, in the Korean Intellectual Property Office, the disclosures of which are incorporated herein in their entireties by reference.

BACKGROUND

1. Field

Apparatuses and methods consistent with exemplary embodiments relate to rendering geometric shapes, and more particularly, to rendering one or more geometric shapes by using information such as texture information, vertex information, and uniformity information.

2. Description of the Related Art

A graphic rendering engine such as a rasterization engine performs rendering of geometric shapes for generating two-dimensional (2D) images to be displayed on a computer monitor, a television screen, or other display devices. An image may denote a 2D screen or a three-dimensional (3D) screen depending on an application. For example, in a computer game application, a 2D representation of a 3D screen may be obtained by rendering polygons of a wire frame model. A rendering engine may be used in a 2D application for rendering text, icons, images, or other elements in a 2D user interface.

An appearance of a geometric shape such as a polygon in a rendered image may be controlled by texture information that defines a texture that is to be applied to the geometric shape while performing the rendering operation. If there are a plurality of shapes on a screen, a bottleneck phenomenon may occur when an engine binds the textures separately to each of the shapes, and accordingly, variations in rendering states may occur. To address the above phenomenon, a plurality of small textures may be packaged with one large texture, which may be referred to as a texture atlas. Since it is faster to bind one large texture to each of the shapes than to bind a large number of small textures, using the texture atlas may achieve improvement in rendering performance. When it is needed to package textures of different sizes to a texture atlas, a program tries to arrange textures in an efficient way in order to reduce an overall size of the texture atlas as much as possible.

SUMMARY

One or more exemplary embodiments provide an apparatus and a method for rendering geometric shapes, in which a time required to perform the rendering and data processing amount may be reduced.

Additional aspects will be set forth in part in the description which follows and, in part, will be apparent from the description, or may be learned by practice of the presented exemplary embodiments.

According to an aspect of an exemplary embodiment, there is provided a method of rendering an image in a display apparatus, the method including: acquiring information about a repeated shape that represents at least a part of one or more geometric shapes included in the image and repeatedly occurs in the one or more geometric shapes; acquiring rendering information representing a method of rendering the one or more geometric shapes based on the information about the repeated shape; and rendering the one or more geometric shapes based on the information about the repeated shape and the rendering information.

The acquiring of the information about the repeated shape may include determining the repeated shape from among one or more partial shapes respectively representing parts of the one or more geometric shapes, wherein the repeated shape includes a partial shape corresponding to two or more part of the one or more geometric shapes.

The determining may include: determining a second partial shape that is similar to a first partial shape among the one or more partial shapes by a predetermined degree or greater, from among remaining partial shapes of the one or more partial shapes; and determining at least one from among the first partial shape and the second partial shape as the repeated shape.

The rendering information may include information about a method of transforming the repeated shape to render the one or more geometric shapes.

The information about the method of transforming the repeated shape may include at least one from among location information of the repeated shape, rotation information of the repeated shape, symmetric transformation information of the repeated shape, and scaling information of the repeated shape.

The method may further include acquiring information representing the one or more geometric shapes, wherein the information representing the one or more geometric shapes may include at least one from among texture information that is used to acquire a cubic image, and vertex information that is information about a point at which two or more lines defining the one or more geometric shapes intersect each other, and the information about the repeated shape may be acquired from the information representing the one or more geometric shapes.

The method may further include acquiring information representing the one or more geometric shapes, wherein the information representing the one or more geometric shapes may include at least one from among color information of the one or more geometric shapes, distance field information indicating a distribution of points defining the one or more geometric shapes, and curve information indicating at least one curve defining the one or more geometric shapes, and the information about the repeated shape is acquired from the information representing the one or more geometric shapes.

The method may further include storing the information about the repeated shape by using at least one from among a lossy compression method and a lossless compression method.

The one or more geometric shapes may include one or more user interface elements of the display apparatus.

According to an aspect of an exemplary embodiment, there is provided a method of acquiring information for rendering an image in a display apparatus, the method including: acquiring information representing one or more geometric shapes included in the image; acquiring, from the acquired information, information about a repeated shape that represents at least a part of the one or more geometric shapes and repeatedly occurs in the one or more geometric shapes; and acquiring rendering information that represents a method of rendering the one or more geometric shapes based on the information about the repeated shape, wherein the one or more geometric shapes are rendered based on the information about the repeated shape and the rendering information.

According to an aspect of an exemplary embodiment, there is provided a display apparatus for rendering an image, the display apparatus including: an acquirer configured to acquire information about a repeated shape that represents at least a part of one or more geometric shapes included in the image and repeatedly occurs in the one or more geometric shapes, and configured to acquire rendering information that represents a method of rendering the one or more geometric shapes based on the information about the repeated shape; and a controller configured to render the one or more geometric shapes based on the information about the repeated shape and the rendering information.

The repeated shape may include a partial shape corresponding to two or more parts of the one or more geometric shapes from among one or more partial shapes respectively representing parts of the one or more geometric shapes.

The controller may determine a second partial shape that is similar to a first partial shape among the one or more partial shapes by a predetermined degree or greater, from among remaining partial shapes of the one or more partial shapes, and configured to determine at least one from among the first partial shape and the second partial shape as the repeated shape.

The rendering information may include information about a method of transforming the repeated shape to render the one or more geometric shapes.

The information about the method of transforming the repeated shape may include at least one from among location information of the repeated shape, rotation information of the repeated shape, symmetric transformation information of the repeated shape, and scaling information of the repeated shape.

The acquirer may acquire information representing the one or more geometric shapes, and the information representing the one or more geometric shapes may include at least one from among texture information that is used to acquire a cubic image, and vertex information that is information about a point at which two or more lines defining the one or more geometric shapes intersect each other, color information of the one or more geometric shapes, distance field information indicating a distribution of points defining the one or more geometric shapes, and curve information indicating at least one curve defining the one or more geometric shapes, and the information about the repeated shape may be acquired from the information representing the one or more geometric shapes.

The display apparatus may further include a display configured to display a rendering result.

The display apparatus may further include a memory configured to store the information about the repeated shape by using at least one from among a lossy compression method and a lossless compression method.

According to an aspect of an exemplary embodiment, there is provided a display apparatus for acquiring information for rendering an image, the display apparatus including: an acquirer configured to acquire information representing one or more geometric shapes included in the image; and a controller configured to acquire, from the acquired information, information about a repeated shape that represents at least a part of the one or more geometric shapes and repeatedly occurs in the one or more geometric shapes, and configured to acquire rendering information that represents a method of rendering the one or more geometric shapes based on the information about the repeated shape, wherein the one or more geometric shapes are rendered based on the information about the repeated shape and the rendering information.

According to an aspect of an exemplary embodiment, there is provided a non-transitory computer-readable medium recorded thereon a program, which, when executed by a computer, performs the data processing method.

BRIEF DESCRIPTION OF THE DRAWINGS

The above and/or other aspects will be more apparent by describing certain example embodiments with reference to the accompanying drawings in which:

FIG. 8 is a flowchart illustrating a method of storing pattern information in a lossless compression formation through pattern identification, according to an exemplary embodiment;

DETAILED DESCRIPTION

Figure 1:
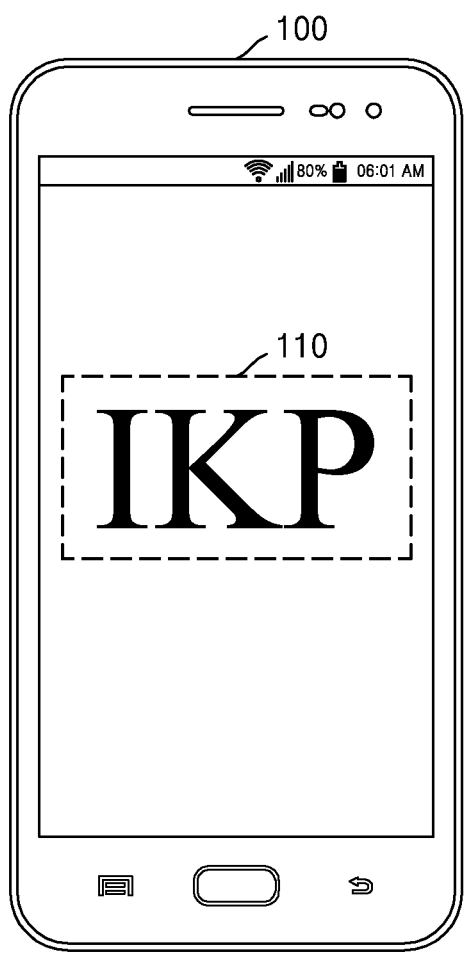
FIG. 1 is a diagram of a device for processing an image and displaying the image according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects.

Hereinafter, the terms used in the specification will now be briefly defined, and the embodiments will now be described in detail.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

When a part "includes" or "comprises" an element, unless there is a particular description contrary thereto, the part can further include other elements, not excluding the other elements. Also, the term 'unit' in the embodiments of the present invention means a software component or hardware components such as a field-programmable gate array (FPGA) or an application-specific integrated circuit (ASIC), and performs a specific function. However, the term 'unit' is not limited to software or hardware. The 'unit' may be formed so as to be in an addressable storage medium, or may be formed so as to operate one or more processors. Thus, for example, the term 'unit' may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and 'units' may be associated with a smaller number of components and 'units', or may be divided into additional components and 'units'.

It will be understood that when an element is referred to as being "connected to" or "combined to" another element, it may be "directly connected or combined" to the other element, or "electrically connected to" the other element with intervening elements therebetween. It will be further understood that the terms "comprises", "comprising", "includes", and/or "including" when used herein, specify the presence of components, but do not preclude the presence or addition of one or more other components, unless otherwise specified.

In the present specification, "application" refers to a combination of a series of computer programs designed to perform certain functions. Applications recited in the present specification may be various, e.g., a game application, a video reproducing application, a map application, a memo application, a calendar application, a phone book application, a broadcast application, a workout support application, a pay application, a photo book application, etc., but are not limited thereto.

In addition, throughout the present specification, rendering may denote a method of processing graphic data. For example, rendering may include a method of adding data considering external information such as a light source, a location, and a color to two-dimensional graphic data. As another example, rendering may denote a graphic data processing method for processing graphic data to display the graphic data. Here, the graphic data may include texture information, vertex information, etc.

Hereinafter, the inventive concept will be described in detail by explaining exemplary embodiments with reference to the attached drawings. In the drawings, elements that are irrelevant with the description will be omitted. As used herein, the term "and/or" includes any and all combinations of one or more of the associated listed items. Expressions such as "at least one of," when preceding a list of elements, modify the entire list of elements and do not modify the individual elements of the list.

FIG. 1 is a diagram of a device 100 for processing an image and displaying the image, according to an exemplary embodiment.

The device 100 according to the exemplary embodiment may display an image 110. The device 100 may perform a rendering operation of a geometric shape or pattern representing the image 110 to display the image 110. The device 100 may display the image 110 by using a result of the rendering operation.

Figure 2:
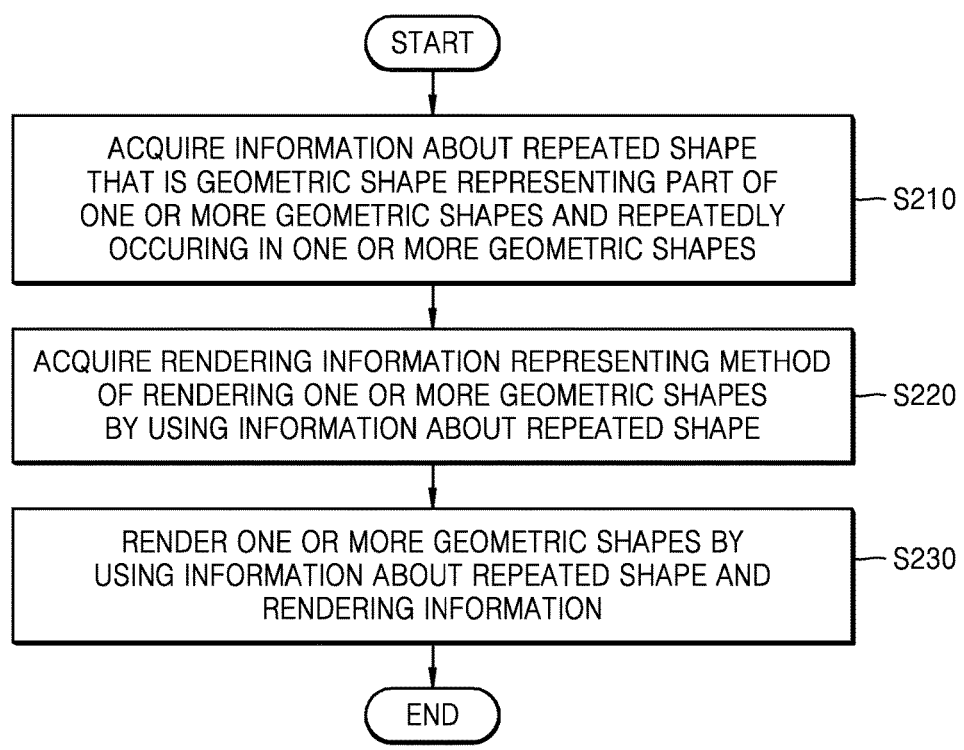
FIG. 2 is a flowchart illustrating a method of rendering a geometric image, according to an exemplary embodiment.

FIG. 2 is a flowchart illustrating a method of rendering a geometric shape according to an exemplary embodiment.

In operation S210, the device 100 according to the exemplary embodiment acquires information about a repeated shape that is a geometric shape representing at least a part of one or more geometric shapes and repeatedly occurs in the one or more geometric shapes.

A geometric shape according to the exemplary embodiment may denote a shape of an object that is displayed on the device 100. For example, the geometric shape may be a target of rendering in the device 100. Here, the geometric shape may include data about the shape of the object, as well as the shape itself. As another example, the geometric shape may include data about one or more user interface elements. For example, the geometric shape may include a shape of an icon displayed on the device 100.

A partial shape according to the exemplary embodiment may denote a geometric shape representing a part of the one or more geometric shapes according to an exemplary embodiment. For example, the one or more geometric shapes may include a plurality of partial shapes. As another example, the partial shape may correspond to a part of the one or more geometric shapes. As another example, the partial shape may include information indicating a shape of a part of the one or more geometric shapes.

A repeated shape according to the exemplary embodiment may represent a part of the one or more geometric shapes, and may repeatedly occur in the one or more geometric shapes. For example, a predetermined shape may occur repeatedly in the one or more geometric shapes. In this case, the repeated geometric shape may be referred to as the repeated shape.

The device 100 according to the exemplary embodiment may determine the repeated shape in the one or more geometric shapes.

The device 100 may determine the repeated shape that is a partial shape corresponding to two or more parts of the one or more geometric shapes, from among one or more partial shapes representing parts of the one or more geometric shapes. The device 100 according to the exemplary embodiment may determine a plurality of partial shapes configuring the one or more geometric shapes. From among the plurality of partial shapes, the device 100 may classify a partial shape corresponding to two or more parts of the one or more geometric shapes as the repeated shape. The method of determining the repeated shape will be described in more detail later with reference to FIG. 3.

The one or more geometric shapes according to the exemplary embodiment may include one or more user interface elements. For example, the one or more geometric shapes may include shapes of icon images. As another example, the one or more geometric shapes may include shapes of images configuring the user interface.

The device 100 according to the exemplary embodiment may acquire information about the determined repeated shape. The information about the repeated shape may include information used to reconstruct or render the shape of the repeated shape. For example, if the repeated shape is a circle, the information about the repeated shape may include information about a radius, a line thickness, a color inside the circle, and/or a color outside the circle.

The device 100 may acquire information representing the determined repeated shape. For example, the device 100 may acquire at least one of geometric information, texture information, vertex information, and shape information of the determined repeated shape.

The texture information according to the exemplary embodiment may be information used to acquire a cubic (or a three-dimensional (3D)) image. For example, the texture information may be information used in a texture mapping and used when applying a two-dimensional (2D) image to a surface of a 3D object.

The vertex information according to the exemplary embodiment may include information about a vertex included in the geometric shape. For example, the vertex information may include information about a point where two or more lines included in the geometric shape intersect each other.

In operation S220, the device 100 according to the exemplary embodiment acquires rendering information about a method of rendering one or more geometric shapes based on the information about the repeated shape, which is obtained in operation S210.

The rendering information according to the exemplary embodiment may include information representing the method of rendering the one or more geometric shapes based on the information about the repeated shape. For example, the rendering information may include information indicating a location of the repeated shape in the one or more geometric shapes. As another example, the rendering information may include information about a method of transforming the repeated shape to render the one or more geometric shapes. According to the exemplary embodiment, the information about the method of transforming the repeated shape may include at least one of location information of the repeated shape used to render the one or more geometric shapes based on the information about the repeated shape, rotation information of the repeated shape, symmetric transformation information of the repeated shape, and scaling information of the repeated shape.

The device 100 according to the exemplary embodiment may render the one or more geometric shapes based on the information about the repeated shape. For example, the device 100 may render the one or more geometric shapes by using the texture information of the repeated shape. As another example, the device 100 may render the one or more geometric shapes by using the vertex information of the repeated shape to display the one or more geometric shapes.

When rendering the one or more geometric shapes, the device 100 according to the exemplary embodiment may use the rendering information. For example, the device 100 may perform the rendering operation of the one or more geometric shapes based on the information about the repeated shape and the information about the location of the repeated shape.

As another example, the device 100 may perform the rendering of the one or more geometric shapes based on the information about the repeated shape and the information about transformation of the repeated shape.

The information about the repeated shape according to the exemplary embodiment may denote information representing a repeated geometric shape. For example, the information representing the repeated shape may include at least one of geometric information of the repeated geometric shape, texture information, vertex information, shape information, color information, distance field information, and curve information. For example, the information representing one or more geometric shapes may include texture information of the geometric shape. As another example, the information representing one or more geometric shapes may include curve information indicating curved parts of the geometric shape. In addition, the information about the repeated shape according to the exemplary embodiment may be obtained from information representing one or more geometric shapes.

The distance field information according to the exemplary embodiment may include information indicating distribution of points configuring the geometric shape. For example, the distance field information may include information about a boundary pixel distance.

The curve information according to the exemplary embodiment may include information indicating curves included in the geometric shape. For example, the curve information may include information about a radius of curvature of the curves included in the geometric shape.

The information about the repeated shape may be stored in a lossy compression method or a lossless compression method. For example, the device 100 may perform the rendering operation of the one or more geometric shapes by acquiring the information about the repeated shape stored in the lossy compression method or the lossless compression method. As another example, the device 100 may store the acquired information about the repeated shape by using the lossy compression method or the lossless compression method, or transmit the acquired information to outside of the device 100.

In operation S230, the device 100 renders the one or more geometric shapes based on the information about the repeated shape and the rendering information.

The rendering information according to the exemplary embodiment may include information representing a method of rendering one or more geometric shapes based on the information about the repeated shape.

The device 100 according to the exemplary embodiment may render the one or more geometric shapes based on the information about the repeated shape and the rendering information. For example, the device 100 may perform the rendering operation of the one or more geometric shapes based on the information about the repeated shape and the information about the location of the repeated shape. As another example, the device 100 may perform the rendering operation of the one or more geometric shapes based on the information about the repeated shape and the information about transformation of the repeated shape.

The device 100 according to the exemplary embodiment may store a result of the rendering operation performed in operation S230 in a storage medium. Here, the device 100 may store the result of the rendering operation performed in operation S230 in the storage medium by using the lossy compression method or the lossless compression method.

The device 100 according to the exemplary embodiment may display the result of the rendering operation performed in operation S230 on a display.

Since the device 100 according to the exemplary embodiment performs the rendering operation with respect to the repeated shape based on the information about the repeated shape, when rendering the one or more geometric shapes, a time duration required to perform the rendering and data processing amount may be reduced.

Figure 3:
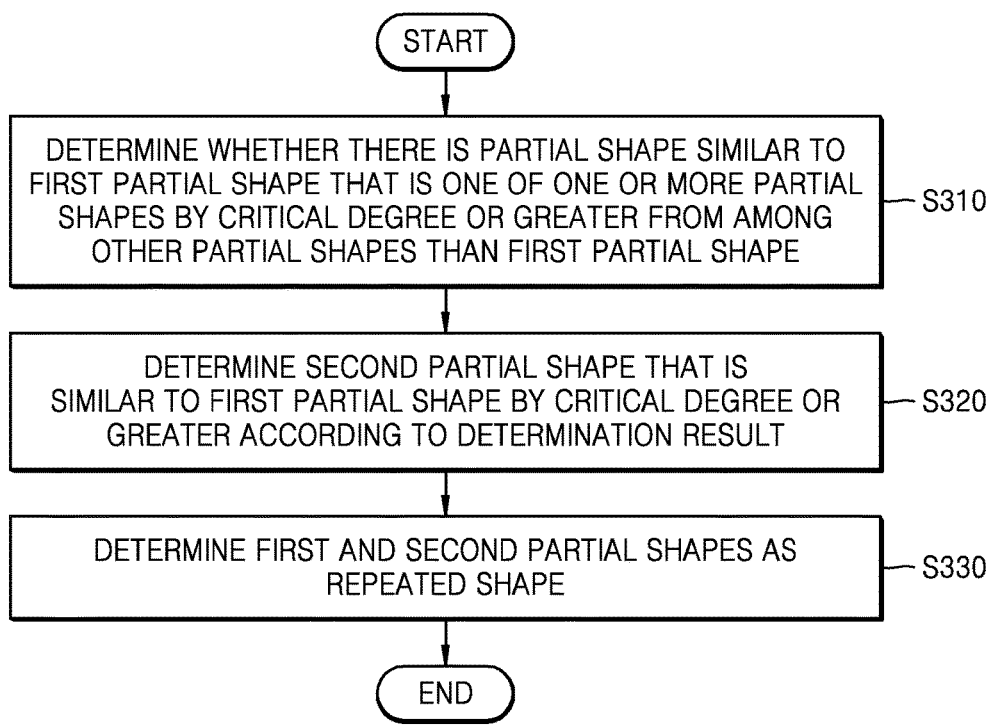
FIG. 3 is a flowchart illustrating a method of determining a repeated shape, according to an exemplary embodiment.

FIG. 3 is a flowchart illustrating a method of determining a repeated shape, according to an exemplary embodiment.

In operation S310, the device 100 according to the exemplary embodiment determines whether one or more partial shapes are similar to a first partial shape that is one of one or more partial shapes by a critical (or a predetermined) degree or greater.

The device 100 may determine a plurality of partial shapes configuring the one or more geometric shapes. In addition, the device 100 may determine one of a plurality of partial shapes as the first partial shape. The device 100 according to the exemplary embodiment may determine whether there is a partial shape corresponding to the first partial shape, from among the plurality of partial shapes except for the first partial shape. For example, the device 100 may determine whether there is a partial shape, from among the plurality of partial shapes, which is similar to the first partial shape by a critical degree or greater. Here, the partial shape that is similar to the first partial shape by the critical degree or greater may be the partial shape corresponding to the first partial shape.

Whether the partial shape is similar to the first partial shape by the critical degree or greater may be determined by using various methods. For example, the device 100 according to the exemplary embodiment may determine whether the partial shape is similar to the first partial shape by the critical degree or greater based on a similarity degree between the shapes after performing, for example but not limited to, size variation, scaling, rotation, symmetric movement, reflection, translation, etc. with respect to the first partial shape. Operations of determining the similarity degree between the shapes may be performed by using a well known technology.

In operation S320, the device 100 determines a second partial shape that is similar to the first partial shape by the critical degree or greater according to the determination result.

As a result of determination in operation S310, the device 100 according to the exemplary embodiment may determine the partial shape similar to the first partial shape by the critical degree or greater from among the plurality of partial shapes as the second partial shape, if there is the partial shape similar to the first partial shape by the critical degree or greater. Here, the first partial shape and the second partial shape may be similar to each other by the critical degree or greater.

In operation S330, the device 100 determines the first partial shape and the second partial shape as the repeated shapes.

The device 100 may determine the first partial shape and the second partial shape that is determined in operation S320 as the repeated shapes.

The device 100 according to another exemplary embodiment may determine the first partial shape or the second partial shape determined in operation S320 as the repeated shape.

For example, if the device 100 determines that there is the second partial shape that is similar to the first partial shape by the critical degree or greater, the device 100 may determine the first partial shape as the repeated shape. In this case, the device 100 may not store information about the second partial shape. When the device 100 stores information about the one or more geometric shapes, only the information about the first partial shape may be used, without using the information about the second partial shape. In this case, the information about the first partial shape may be used instead of the information about the second partial shape.

Figure 4:
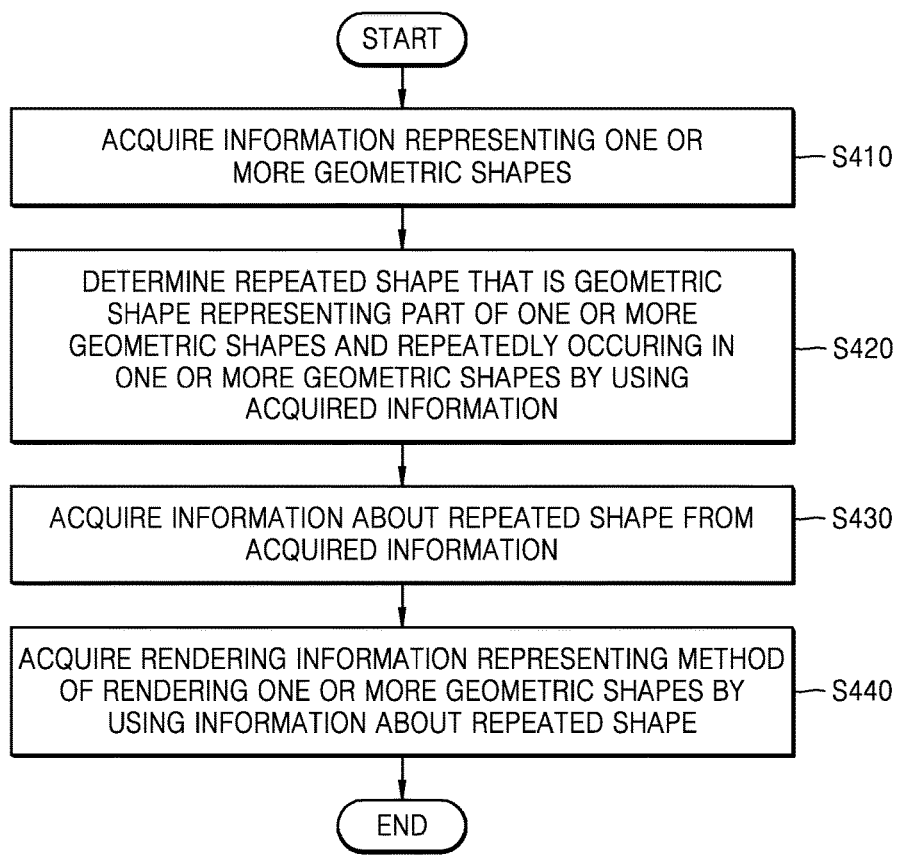
FIG. 4 is a flowchart illustrating a method of obtaining rendering information, according to an exemplary embodiment.

FIG. 4 is a flowchart illustrating a method of acquiring rendering information, according to an exemplary embodiment.

In operation S410, the device 100 according to the exemplary embodiment acquires information representing one or more geometric shapes.

The information representing the one or more geometric shapes according to the exemplary embodiment may include information used to reconstruct or render the one or more geometric shapes. For example, if the one or more geometric shapes are circles, the information representing the one or more geometric shapes may include information about a radius, a line thickness, a color inside the circle, and/or a color outside the circle. As another example, the information representing the one or more geometric shapes may include at least one of geometric information, texture information, vertex information, and shape information of the one or more geometric shapes.

In operation S420, the device 100 according to the exemplary embodiment may determine the repeated shape that is a geometric shape indicating a part of the one or more geometric shapes and repeatedly appearing in the one or more geometric shapes, by using the information acquired in operation S410.

The repeated shape according to the exemplary embodiment may denote a part of the one or more geometric shapes, and may be a geometric shape that repeatedly occurs in the one or more geometric shapes.

Operation S410 corresponds to operation S210 described above, and thus, detailed descriptions thereof are omitted.

In operation S430, the device 100 according to the exemplary embodiment acquires information about the repeated shape from the information acquired in operation S410.

The information representing the repeated shape may denote information representing a repeated geometric shape. For example, the information representing the repeated shape may include at least one of geometric information, texture information, vertex information, shape information, color information, distance field information, and curve information of the repeated geometric shape. For example, the information representing the one or more geometric shapes may include texture information of the geometric shape. As another example, the information representing the one or more geometric shapes may include curve information representing curved portions of the geometric shape. The information about the repeated information may be acquired from the information representing the one or more geometric shapes.

In operation S440, the device 100 according to the exemplary embodiment acquires rendering information representing a method of rendering one or more geometric shapes by using the information about the repeated shape.

The rendering information according to the exemplary embodiment may include information representing a method of rendering the one or more geometric shapes by using the information about the repeated shape.

The device 100 according to the exemplary embodiment may render the one or more geometric shapes based on the information about the repeated shape and the rendering information. For example, the device 100 may perform a rendering operation of the one or more geometric shapes based on the information about the repeated shape and the information about the location of the repeated shape. As another example, the device 100 may perform the rendering operation of the one or more geometric shapes based on the information about the repeated shape and information about transformation of the repeated shape.

Figure 5:
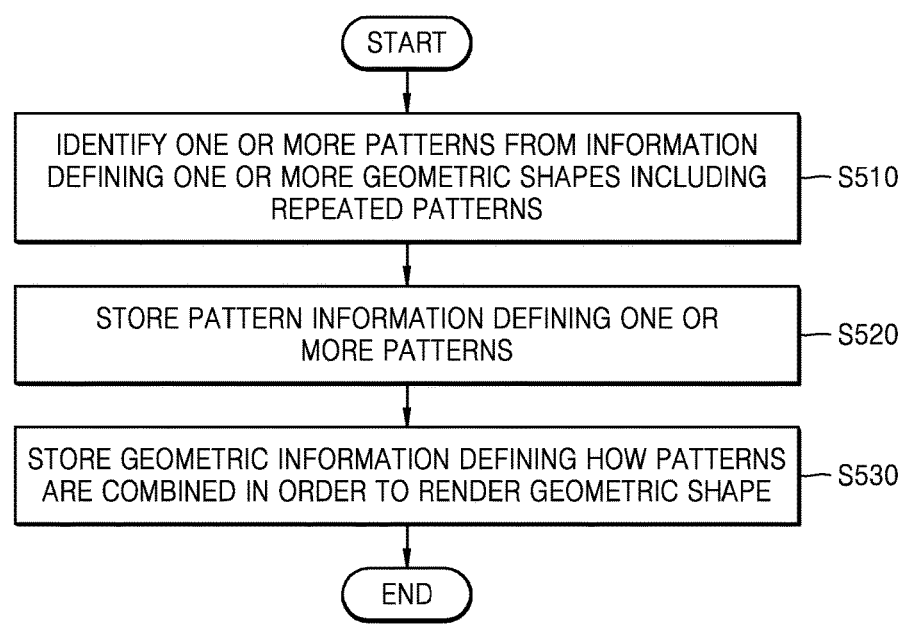
FIG. 5 is a flowchart illustrating a method of storing geometric information for identifying patterns and defining how the patterns are combined, according to an exemplary embodiment.

FIG. 5 is a flowchart illustrating a method of storing geometric information for identifying patterns and defining how the patterns are combined, according to an exemplary embodiment.

In operation S510, the device 100 according to the exemplary embodiment identifies one or more patterns from information that defines one or more geometric shapes including a repeated pattern.

A pattern according to the exemplary embodiment may include all or a part of the geometric shape or information representing all or a part of the geometric shape. For example, the pattern may include a partial shape as described above with reference to FIG. 2. In particular, the pattern according to the exemplary embodiment may denote a geometric shape representing a part of the one or more geometric shapes. For example, the one or more geometric shapes may include a plurality of patterns. As another example, the pattern may correspond to a part of the one or more geometric shapes. As another example, the pattern may include information representing a partial shape of the one or more geometric shapes.

The repeated pattern may denote a pattern that repeatedly occurs, e.g., that occurs two or more times in the one or more geometric shapes. For example, the repeated pattern may include a repeated shape or information representing the repeated shape. Here, the repeated shape may denote a geometric shape repeatedly occurring in the one or more geometric shapes. The repeated shape as described above with reference to FIG. 2 may be applied.

The information defining the geometric shape according to the exemplary embodiment may include information about patterns. The device 100 according to the exemplary embodiment may acquire information about a repeated pattern from the information defining the geometric shape.

One or more patterns including the repeated pattern may be acquired or identified from texture information. The repeated pattern may be identified by comparing separate parts of the geometric shape or the texture information to determine whether the separate parts of the geometric shape match with each other. For example, a part of the geometric shape may be mapped to another part by using one or more transformations of the geometric shape. The separate parts may not need to be exactly identical with each other to be determined as the repeated pattern. In the exemplary embodiment, if a part of the geometric shape may be mapped to another part of the same geometric shape or another geometric shape through one or more transformations, the part of the geometric shape may be identified as the repeated pattern. For example, examples of the transformation may include scaling, rotating, reflection, and translation. According to the exemplary embodiment, if parts of the geometric shape have textures (e.g., color) and/or geometries that are similar to each other, the parts may be identified as a repeated pattern or repeated patterns.

In operation S520, the device 100 stores pattern information for defining one or more patterns.

After identifying the one or more patterns, the one or more patterns that have been identified may be combined to each other to reconstruct original texture information. Pattern information defining one or more patterns including the repeated pattern may be stored in operation S520. The pattern information may be stored in a volatile memory such as a random access memory (RAM) or a non-volatile memory such as a hard disk drive (SDD) or a solid state drive (SSD). The pattern information may be stored in various formats. The pattern information may be stored in a format that is the same as that of the original texture information, or in a different format. For example, the pattern information may be stored as color information, distance field information, and/or curve data. According to some exemplary embodiments, the pattern information may be stored as polygon data before being rasterized. For example, the rasterization engine may exactly position the pattern on the screen to render corresponding parts of the polygon.

In operation S530, the device 100 according to the exemplary embodiment stores geometric information that defines how the patterns are combined to each other to render the geometric shapes.

In operation S530, the geometric information that defines how the patterns are combined to each other may be stored for rendering each geometric shape. As illustrated in operation S530, the geometric information may be stored in an appropriate memory. The geometric information may precisely define how the patterns are located to render the geometric shape that is configured by the plurality of patterns. Also, the geometric information may define a transformation to be applied to the patterns before rendering the geometric shape. For example, in the exemplary embodiment, transformation may include, but not limited to, rotation, scaling, reflection, and translation.

As described above, the geometric information may include information about how the patterns are combined to render the one or more geometric shapes. However, the combination may not necessarily imply pattern information for defining a plurality of patterns. In some exemplary embodiments, the pattern information may define a single repeated pattern that may be combined with copies of itself, according to the texture information. The geometric shape may be rendered by duplicating the repeated pattern, applying the transformation (or translation) defined by the geometric information, and combining of the duplicated patterns. For example, as will be described later, a second geometric shape 912 and a third geometric shape 914 shown in FIG. 9 may be rendered by using a single repeated pattern.

Regardless of the example illustrated in FIG. 5, the pattern information is stored before storing the geometric information, and an order of performing the storing operations may be different from that illustrated in FIG. 5. In another exemplary embodiment, the pattern information and the geometric information may be stored simultaneously. Otherwise, the pattern information may be stored after storing the geometric information.

Figure 6:
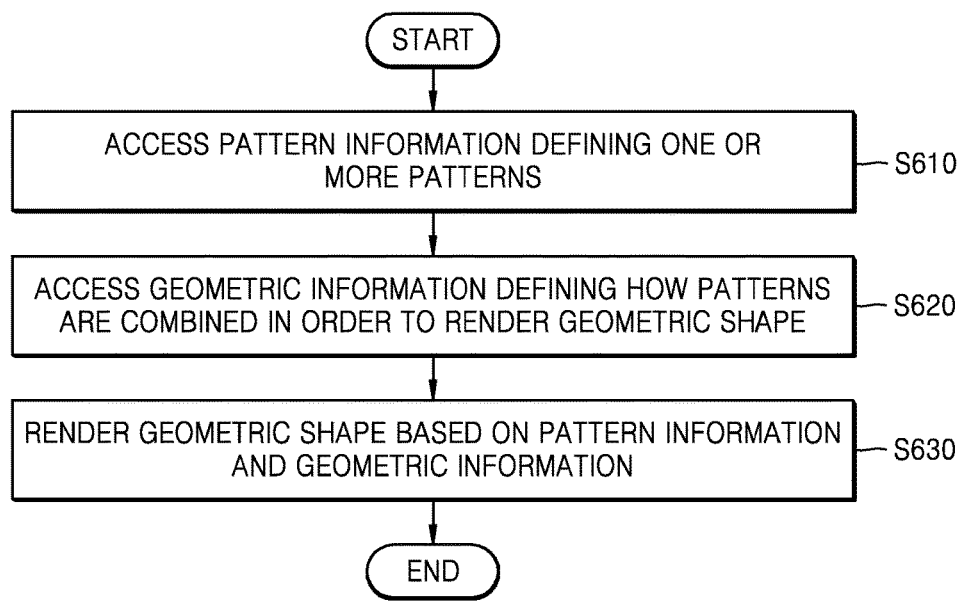
FIG. 6 is a flowchart illustrating a method of rendering a geometric shape, according to an exemplary embodiment.

FIG. 6 is a flowchart illustrating a method of rendering a geometric shape according to an exemplary embodiment. The method of rendering one or more geometric shapes according to the exemplary embodiment will be described with reference to FIG. 6.

In operation S610, the device 100 according to the exemplary embodiment accesses the pattern information defining one or more patterns.

In operation S620, the device 100 accesses the geometric information that defines how the patterns are combined to render the geometric shape.

In operation S630, the device 100 renders the geometric shape based on the pattern information and the geometric information.

The pattern information for defining the one or more patterns may be accessed in operation S610 and the geometric information that defines how the one or more patterns are combined to render the one or more geometric shapes may be accessed in operation S620. According to the exemplary embodiment, the pattern information and the geometric information may be accessed simultaneously or in a certain order. In addition, in operation S630, the one or more geometric shapes may be rendered based on the pattern information or the geometric information.

As described above, the one or more geometric shapes may be rendered by combining the patterns according to the geometric information in operation S630. The geometric information defines a transformation (or translation) method to be applied and a method of positioning the pattern. In particular, in operation S630, the rendering process may include a process of duplicating the repeated pattern for rendering the one or more geometric shapes and a process of arranging the repeated patterns according to the geometric information. For example, when a first geometric shape and a second geometric shape are rendered, a repeated pattern may be used in rendering both the first and second geometric shapes. In this case, the repeated pattern may be a pattern that is repeated between the first and second geometric shapes. As another example, a single geometric shape may be rendered by duplicating the repeated pattern based on the geometric information as described above. In this case, the repeated pattern may be repeated by using a single geometric shape.

Figure 7:
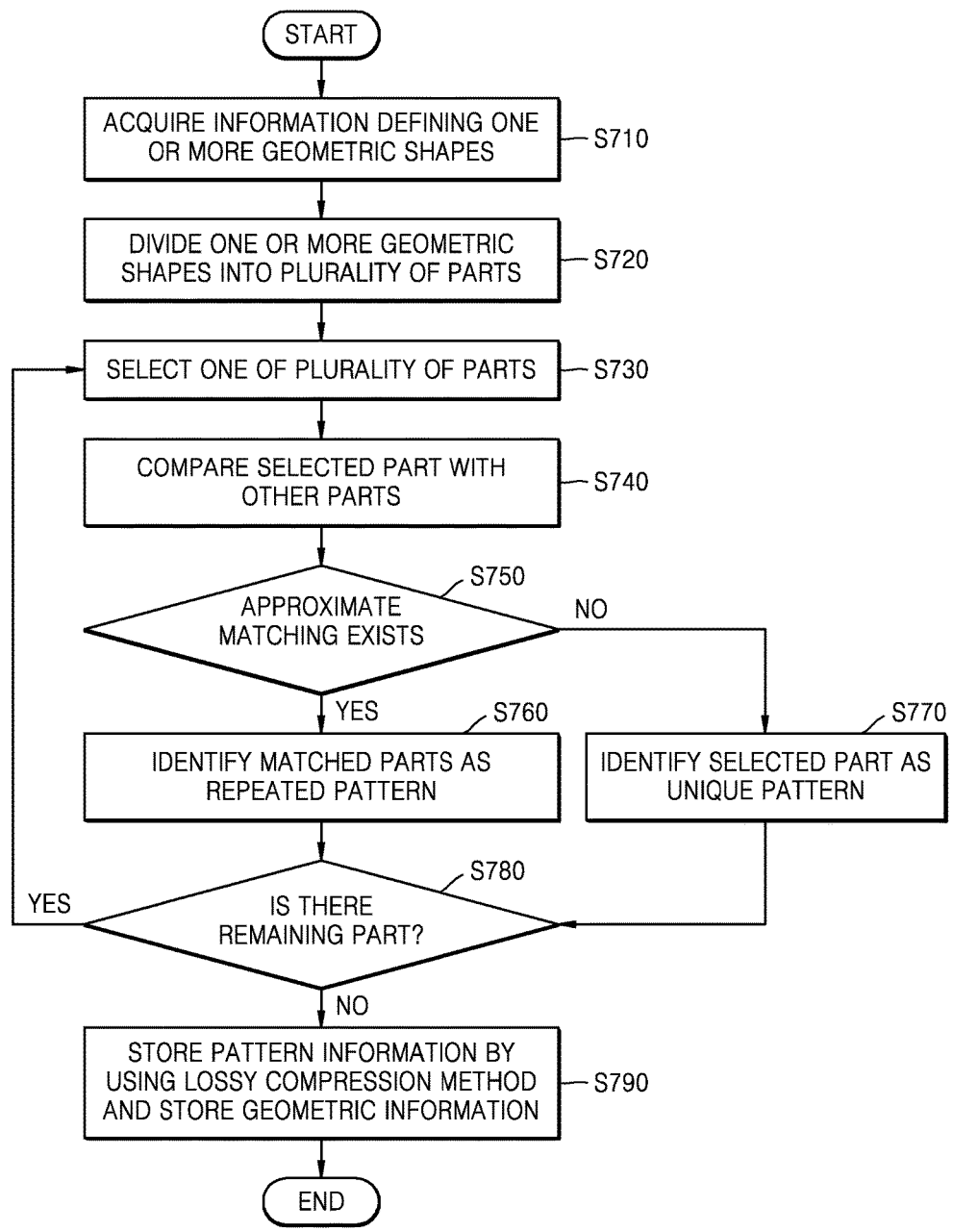
FIG. 7 is a flowchart illustrating a method of storing pattern information after identifying patterns, according to an exemplary embodiment.

FIG. 7 is a flowchart illustrating a method of storing pattern information through pattern identification, according to the exemplary embodiment.

The method of generating pattern information by using a lossy compression method will be described with reference to FIG. 7. The above method may include an example of a pattern matching algorithm that is used to identify a pattern from texture information about one or more geometric shapes, in the exemplary embodiment of storing the pattern information by using the lossy compression.

In operation S710, the device 100 according to the exemplary embodiment acquires information defining one or more geometric shapes.

In operation S710, the texture information about one or more geometric shapes may be acquired. The texture information may be in the form of a texture atlas according to the prior art including the texture information about a plurality of geometric shapes as shown in FIG. 1. Alternatively, the texture information about each geometric shape may be separately acquired.

In operation S720, the device 100 divides the one or more geometric shapes into a plurality of parts of the one or more geometric shapes.

Figure 9A:
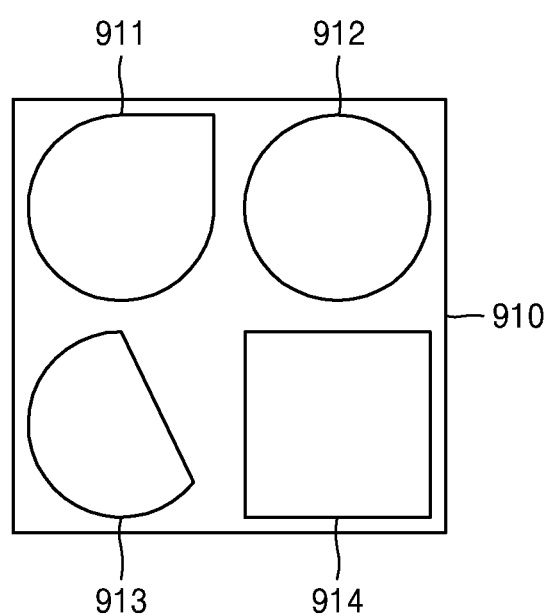
FIG. 9A is a diagram of a plurality of geometric shapes, according to an exemplary embodiment.
Figure 9B:
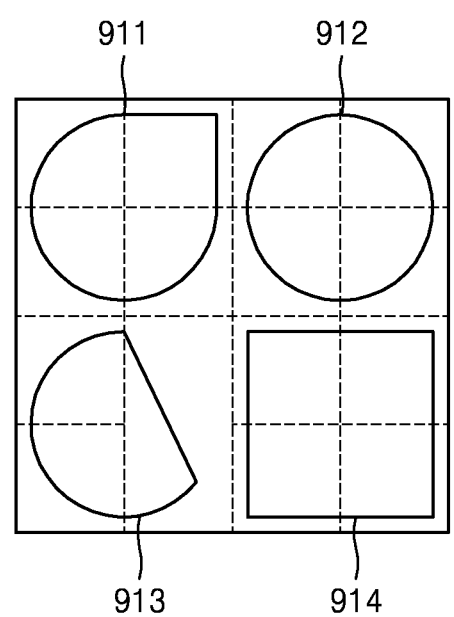
FIG. 9B is a diagram illustrating an example of dividing a plurality of geometric shapes, according to an exemplary embodiment.

For example, in operation S720, a method illustrated in FIG. 9B may be used to divide the geometric shapes.

In operation S730, the device 100 selects one of the plurality of parts. In addition, in operation S740, the device 100 compares the selected part with other parts.

For example, one of the plurality of parts is selected in operation S730, and the selected part is compared with other parts to determine whether there is a match in operation S740. In the present exemplary embodiment, the pattern information is stored by using the lossy compression method, that is, some of the pattern information may be lost when compressing the pattern information. Even when there is only an approximate matching between the divided parts of the texture information, the parts may still be represented in the same compression pattern. The approximate matching may be defined in terms of a critical level in accuracy. In addition, the approximate matching may be performed in texture and/or geometric point of view. For example, a correlation value may be obtained between the divided parts of the texture information. In addition, if the correlation value between the selected part and the other parts compared with the selected part exceeds a critical value, it may be identified that the above parts are matched to each other.

The approximate matching according to the exemplary embodiment may denote a case in which the two geometric shapes are determined to be similar to each other by a predetermined critical level or greater. For example, if a first shape overlaps a second shape by a predetermined ratio or greater when being rotated by 180°, the first and second shapes may be considered to be approximate matching with each other.

In operation S750, the device 100 determines whether there is approximate matching between the parts.

If there is an approximate matching in operation S750 (S750—YES), the process proceeds to operation S760. If there is no approximate matching (S750—NO), the process proceeds to operation S770.

In operation S760, the device 100 identifies the approximately matched part as a repeated pattern. Alternatively, the approximately matched parts are identified as a repeated pattern.

In operation S770, the device 100 identifies the selected part as a unique pattern.

If there is no approximate matching, the selected part is identified as a unique pattern in operation S770.

In operation S780, the device 100 determines whether there is a remaining part.

In operation S780, the device 100 according to the exemplary embodiment may identify whether there is a remaining part of the texture information, which is to be analyzed. If there is a remaining part to be analyzed, the process returns to operation S730 to select a part of the texture information, which has not been analyzed yet. In addition, processes from operation S740 to operation S780 may be repeatedly performed. Once all of the parts of the texture information are analyzed, operation S790 may be performed.

In operation S790, the device 100 according to the exemplary embodiment stores the pattern information in a lossy compression method and stores the geometric information.

The pattern information and the geometric information are stored in operation S790. The patter information includes information for defining the patterns that are identified as the repeated pattern in operation S760 and information for defining the patterns that are identified as the unique pattern in operation S770. In operation S790, the pattern information may be stored in the lossy compression method.

FIG. 8 is a flowchart illustrating a method of storing pattern information by using a lossless compression method. The method of generating the pattern information by using the lossless compression method will be described with reference to FIG. 8.

Operations S810, S820, S830, S840, S860, S870, and S880 of FIG. 8 correspond to operations S710, S720, S730, S740, S760, S770, and S780 illustrated above with reference to FIG. 7, and thus, repeated descriptions thereof are omitted for convenience of description.

Unlike the method illustrated in FIG. 7, the device 100 according to the exemplary embodiment identifies whether there is an exact matching between the currently selected part and the other parts of the texture information. If there is the exact matching, the selected part may be identified as a repeated pattern in operation S860. In addition, the pattern information may be stored by using the lossless compression method in operation S890.

When comparing with the rendering process that renders the geometric shape directly from the texture information according to the prior art, the method illustrated in FIG. 8 may exactly render the geometric shape from the pattern information and the geometric information so that there is no data loss by using the lossless compression method and identifying the repeated patterns when the exact matching is found. At the same time, according to the method illustrated in FIG. 8, total data amount required during the rendering process may be reduced by a redundancy level of information in the original texture.

The exact matching according to the exemplary embodiment may denote a case where it is determined that two geometric shapes are identical with each other. For example, if a first shape is identical with a second shape after rotating by 180°, it may be considered that the first and second shapes are exactly matched. Here, the identical shapes denote data of the shapes obtained after performing the lossless compression or decompression are identical with each other within an error range.

Hereinafter, a method of compressing information by defining a plurality of geometric shapes will be described according to the exemplary embodiment with reference to FIGS. 9A to 9D. Information defining the plurality of geometric shapes may include at least one of texture information, vertex information, and uniformity information. In addition, the information defining the plurality of geometric shapes may be provided in various formats, wherein the various formats may include color texture information (e.g., bitmap), distance field information (e.g., boundary pixel distance), adaptively sampled distance field (ADF) information and/or curve data (e.g., Bezier curves), but is not limited thereto. In the present exemplary embodiment, the information defining the plurality of geometric shapes may include texture information.

The method according to the exemplary embodiment may be performed by computer program commands executed in one or more processors, unique hardware, or combination of hardware and software elements. The method according to the exemplary embodiment may generate information that is subsequently used by a rendering engine that renders one or more geometric shapes. The geometric shape may include a polygonal shape and/or a curved shape such as a circle, arc, or oval. According to the exemplary embodiment, the geometric shapes may be elements in a user interface, e.g., icons, images, or text. For example, the geometric shapes may include scalable text letters for rendering text in a certain font.

FIG. 9A is a diagram showing a plurality of geometric shapes according to an exemplary embodiment.

FIG. 9A shows a texture atlas 910 including first texture information for rendering a first geometric shape 911, second texture information for rendering a second geometric shape 912, third texture information for rendering a third geometric shape 913, and fourth texture information for rendering a fourth geometric shape 914. The texture information may define textures applied to the geometric shapes during the rendering process. For example, a rasterization engine may be used. According to the exemplary embodiment, the texture information about each geometric shape may be provided in various formats including the color texture information (e.g., bitmap), distance field information (e.g., boundary pixel distance), adaptively sampled distance field (ADF) information and/or curve data (e.g., Bezier curves).

In FIG. 9A, the texture information may be provided in a conventional format of the texture atlas 910. As described above, using the texture atlas 910 may achieve improvement in rendering performance by reducing the number of variations in the rendering state when drawing a large number of geometric shapes. According to the exemplary embodiment, the texture information may be compressed by identifying the repeated patterns in the texture information about one or more geometric shapes. The pattern information defining the pattern may be stored with the geometric information that defines how the patterns are combined to render the one or more geometric shapes. The method of compressing the texture information shown in FIG. 9A will be described below with reference to FIGS. 9B to 9D.

One or more patterns including a repeated shape or a repeated pattern may be obtained or identified from the texture information of FIG. 9A. The repeated shape or the repeated pattern may be identified by comparing independent parts of the geometric shape or the texture information to determine whether the independent parts of the geometric shape are matched with each other. For example, a part may be mapped to another part by using one or more transformation. The independent parts may not need to be exactly identical with each other to be identified as the repeated shape or the repeated pattern. In the exemplary embodiment, a part of the geometric shape may be mapped to another part of the same geometric shape or on another geometric shape through one or more transformations, the part of the geometric shape may be identified as the repeated shape or the repeated pattern. For example, the transformation may include, but not limited to, scaling, rotation, reflection, and translation. According to the exemplary embodiment, the parts having textures (e.g., color) and/or geometries similar to each other may be identified as the repeated shape or the repeated pattern.

A matching algorithm may be used to identify the shape or the patterns. For example, a matching algorithm such as a scale invariant feature transform algorithm may be used. Alternatively, the pattern matching algorithm may select an arbitrary part of the texture information and identify whether the selected part is the repeated pattern, that is, the pattern matching algorithm may identify the patterns by using, for example, a brute-force algorithm. According to the exemplary embodiment, the pattern matching algorithm may use metadata of an original geometric shape to accelerate the pattern identifying process and/or improve the matching quality. For example, if the metadata denotes that the geometric shape is a circle, it may be expected that the texture may have a rotation symmetric feature. In the exemplary embodiment, the pattern matching algorithm may be used to identify the pattern that is internally repeated in the circle by selecting a sector of a geometric shape as a candidate pattern, rotating the candidate pattern, or comparing the selected sector with another part of the geometric shape. If there is no matching part found, the pattern matching algorithm may select another sector of a geometric shape after increasing or decreasing an angle of the sector.

FIG. 9B is a diagram showing an example of dividing the plurality of geometric shapes according to an exemplary embodiment.

The texture information of FIG. 9A may be divided into independent parts to identify the shapes or patterns in the texture information. As shown in FIG. 9B, according to the exemplary embodiment, the texture information of each geometric shape may be divided as quadrants having the same sizes as each other. In another exemplary embodiment, the texture information about one or more geometric shapes may be divided as a plurality of parts having the same size or different sizes from each other.

Figure 9C:
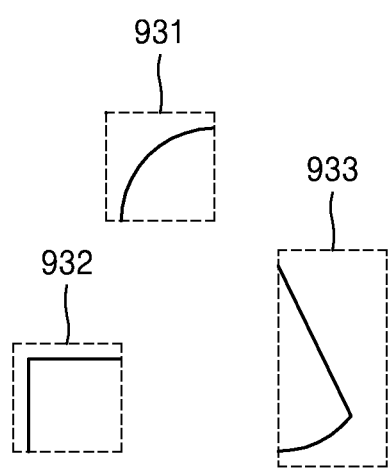
FIG. 9C is a diagram illustrating a method of obtaining a repeated shape from a plurality of geometric shapes, according to an exemplary embodiment.

FIG. 9C is a diagram illustrating a method of obtaining a repeated shape from a plurality of geometric shapes according to an exemplary embodiment.

As shown in FIG. 9C, three shapes 931, 932, and 933 in the exemplary embodiment may be used to reconstruct original texture information or the first through fourth geometric shapes 911, 912, 913, and 914. The shapes or the patterns may include, for example, a first repeated shape 931, a second repeated shape 932, and a unique shape 933. Here, the 'repeated shape' may denote a shape or a pattern that occurs in one or more geometric shapes more than once. The repeated shape may include a shape or a pattern repeated in one geometric shape or repeated in a plurality of geometric shapes. The shape repeated in one geometric shape may be considered as an internally repeated shape. The 'unique shape' may denote a shape or a pattern that occurs in one or more geometric shapes only once. When at least one repeated shape is identified, a size of the texture information may be reduced.

Figure 9D:
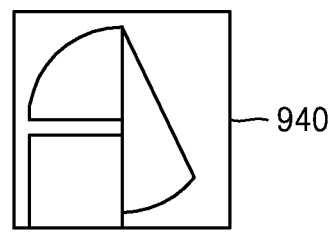
FIG. 9D is a diagram illustrating a method of compressing information about geometric shapes by using a repeated shape, according to an exemplary embodiment.

FIG. 9D is a diagram illustrating a method of compressing information about geometric shapes by using the repeated shape according to an exemplary embodiment.

As shown in FIG. 9D, in an exemplary embodiment, the first repeated shape 931, the second repeated shape 932, and the unique shape 933 may be packed in one file 940. Hereinafter, such file may be referred to as 'pattern atlas' in consideration of the conventional texture atlas. However, in some exemplary embodiments, pattern information about each pattern may be independently stored. It may be more efficient to store a plurality of patterns in one pattern atlas. Alternatively, it may be more efficient to store the patterns independently than to store the plurality of patterns in one pattern atlas, according to a redundancy level of the texture information.

Figure 10A:
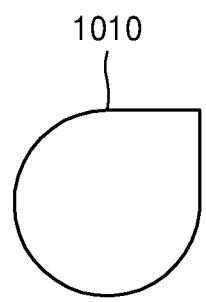
FIG. 10A is a diagram of a geometric shape that is a target to be rendered according to an exemplary embodiment.
Figure 10B:
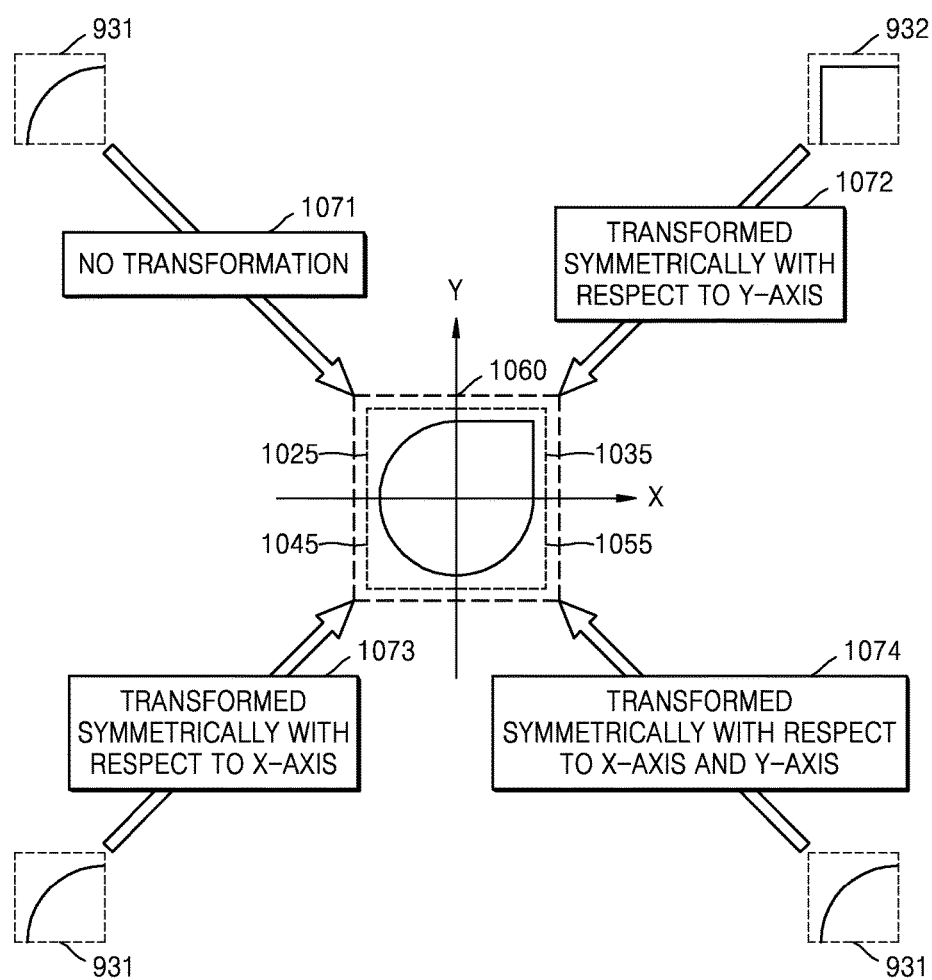
FIG. 10B is a diagram illustrating a method of rendering a geometric shape according to an exemplary embodiment.

FIG. 10A is a diagram showing a geometric shape that is to be rendered according to an exemplary embodiment, and FIG. 10B is a diagram illustrating a method of rendering the geometric shape according to an exemplary embodiment.

The method of rendering the geometric shape based on the pattern information and the geometric information will be described below with reference to FIGS. 10A and 10B. In an exemplary embodiment, a geometric shape 1010 including the first repeated shape 931 and the second repeated shape 932 is rendered based on the pattern information shown in FIGS. 9C and 9D. As shown in FIG. 10B, the geometric information may define a series of commands 1071, 1072, 1073, and 1074 representing how the geometric shape 1010 is rendered by using the first repeated shape 931 and the second repeated shape 932.

In particular, a first part 1025 of the geometric shape 1010 may be rendered by directly using the first repeated shape 931 without transformation. A second part 1035 of the geometric shape 1010 may be rendered by reflecting the second repeated shape 932 across a Y-axis that is a vertical axis in FIG. 10B. A third part 1055 of the geometric shape 1010 may be rendered by reflecting the first repeated shape 931 across both an X-axis and the Y-axis. In addition, a fourth part 1045 of the geometric shape 1010 may be rendered by reflecting the first repeated shape 931 across the X-axis. The geometric information also defines where the patterns will be located in the geometric shape 1010. In FIG. 10B, the transformation is defined based on the reflection across at least one of the X-axis and the Y-axis, but the above effect may be obtained through rotation. For example, the second part 1035 of the geometric shape 1010 may be rendered by rotating the second repeated shape 932 by 90° in a clockwise direction.

Figure 11:
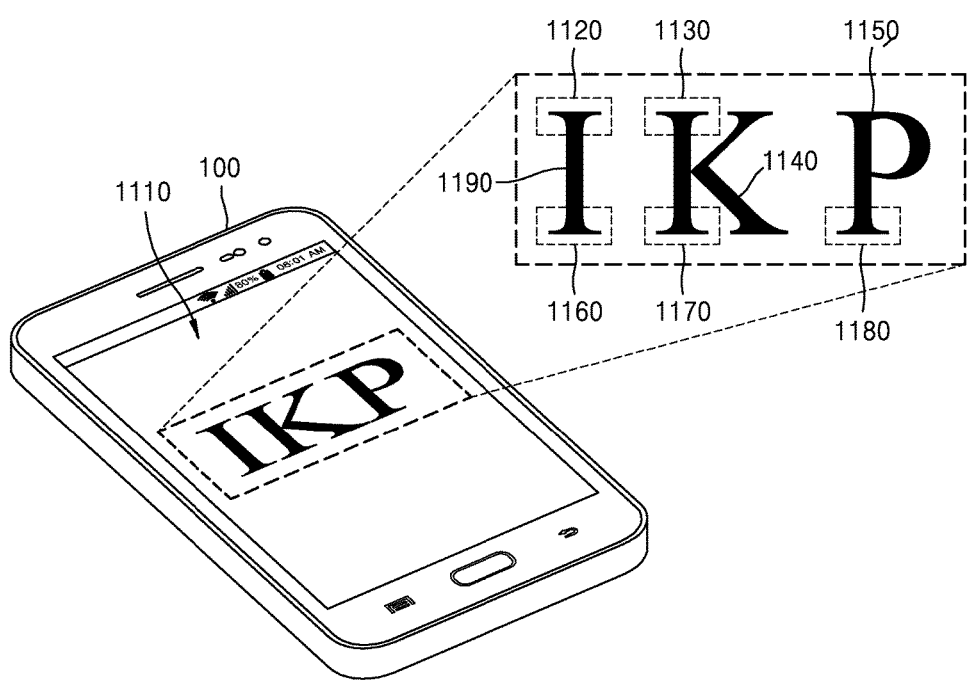
FIG. 11 is a diagram illustrating a method of rendering scalable text in a device, according to an exemplary embodiment.

FIG. 11 is a diagram illustrating a method of rendering scalable text in the device 100 according to an exemplary embodiment.

When rendering one or more geometric shapes, the device 100 according to the exemplary embodiment renders the repeated shape by using information about the repeated shape, and thus, a time taken to perform the rendering operation and data processing amount during the rendering operation may be reduced.

First to third alphabets 1190, 1140, and 1150 may be displayed on a screen 1110 of the device 100. The first to third alphabets 1190, 1140, and 1150 displayed on the screen 1110 may have repeated shapes. For example, a first shape 1120, a second shape 1160, a third shape 1130, a fourth shape 1170, and a fifth shape 1180 may correspond to repeated shapes. When the first shape 1120 is transformed based on a transverse axis of symmetry, the first shape 1120 may be identical with the second shape 1160. The second shape 1160 and the fourth shape 1170 may be identical with or correspond to each other. In this case, the fourth shape 1170 may be rendered only by using the data representing the second shape 1160 and data representing a location of the fourth shape 1170.

FIG. 11 shows usage of pattern information and geometric information when the user interface of the device 100 renders scalable texts, according to an exemplary embodiment. In FIG. 11, the first alphabet 1190, the second alphabet 1140, and the third alphabet 1150 are examples, and the inventive concept may be applied to a case of rendering some elements in the user interface 1110, including icons or images. As illustrated in FIG. 11, a repeated pattern may be identified from texture information about the first to third alphabets 1190, 1140, and 1150.

The method of rendering the scalable text in the user interface 1110 according to the exemplary embodiment may include storing of distance field information about each letter that is to be rendered. A memory needed to store the distance field information may be exponentially increased according to a size of the text. In the exemplary embodiment illustrated in FIG. 11, the repeated patterns are determined, and the geometric information and the pattern information are stored instead of the texture information to improve quality of real-time rendering of the scalable text in the user interface 1110, as described above. The device 100 may store more information and a range in the size of the text to be rendered may be increased, according to the exemplary embodiment.

Figure 12:
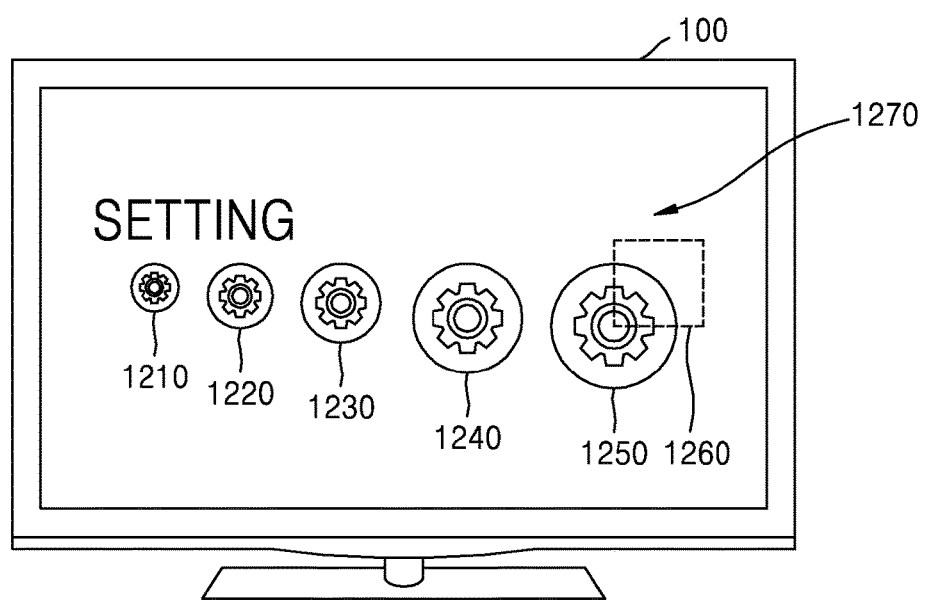
FIG. 12 is a diagram illustrating a method of rendering an icon in a device, according to an exemplary embodiment.

FIG. 12 is a diagram illustrating a method of rendering an icon in the device 100 according to an exemplary embodiment.

FIG. 12 illustrates usage of the pattern information and geometric information when a certain icon is rendered in the user interface of the device 100, according to the exemplary embodiment. In FIG. 12, a bitmap of the icon may have five sizes 1210, 1220, 1230, 1240, and 1250 based on zoom levels according to the exemplary embodiment. The method, which is described with reference to FIGS. 2 to 6, may be applied to render an element in a user interface 1270 including images and text according to the exemplary embodiment. In a user interface according to the prior art, an independent bitmap needs to be stored in the texture atlas in a respective expansion level. On the other hand, according to the exemplary embodiment, a repeated pattern 1260 may be identified from the texture information as shown in FIG. 12. For example, in a case where the repeated pattern is ¼ of the size of an icon, a 75% reduction in icon graphic processing may be achieved by using the repeated pattern in rendering an icon.

In the exemplary embodiments, it is describes that the repeated pattern may be identified from the texture information. However, the exemplary embodiments are not limited thereto and may be applied to any kind of information defining one or more geometric shapes, as well as the texture information. For example, a kind of information defining the geometric shape may include vertex information or uniformity information. According to some exemplary embodiments, combination of different kinds of information may include a combination of the texture information, the vertex information, and/or uniformity information.

Figure 13:
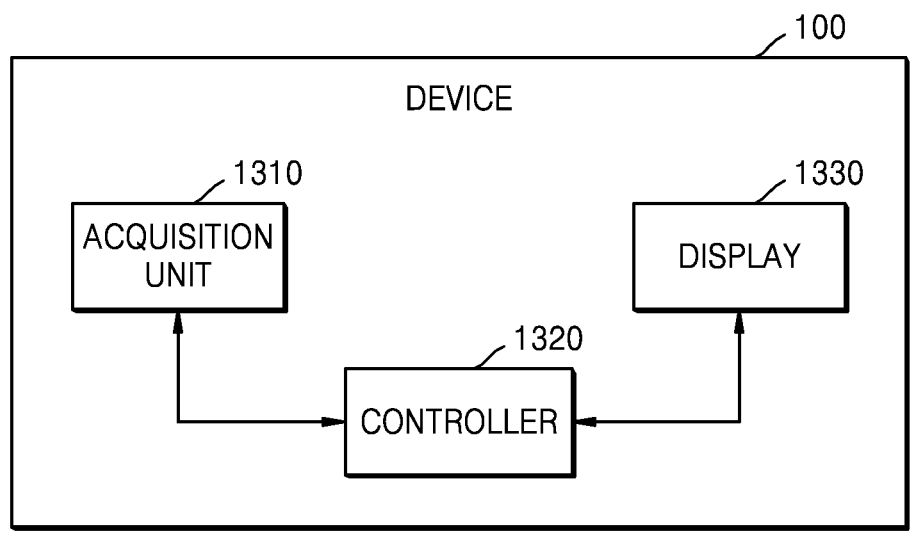
FIG. 13 is a block diagram of a device for processing an image according to an exemplary embodiment.

FIG. 13 is a block diagram of the device 100 for processing an image according to an exemplary embodiment.

As shown in FIG. 13, the device 100 may include an acquisition unit (or an acquirer) 1310, a controller 1320, and a display 1330. However, the device 100 may include more or less elements than those of FIG. 13.

The device 100 may implement the exemplary embodiments related to the data processing method illustrated in above with reference to FIGS. 1 to 12.

The acquisition unit 1310 according to the exemplary embodiment may acquire information about one or more geometric shapes. The geometric shapes according to the exemplary embodiment may represent a shape of an object displayed on the device 100. For example, the geometric shape may be a target object of rendering in the device 100. Here, the geometric shape may include data about the geometric shape, as well as the shape of the object itself.

The acquisition unit 1310 according to the exemplary embodiment may acquire or receive data related to the rendering or the data processing from outside or inside of the device 100. For example, the acquired data may be data used in the rendering of one or more geometric shapes. As another example, the acquired data may be graphic data representing one or more geometric shapes.

The acquisition unit 1310 may acquire information representing one or more geometric shapes.

The information representing the one or more geometric shapes according to the exemplary embodiment may include information used to reconstruct or render the one or more geometric shapes. For example, if the one or more geometric shapes are a circle, the information representing the one or more geometric shapes may include information about a radius, a line thickness, a color inside the circle, and/or a color outside the circle. As another example, the information representing the one or more geometric shapes may include at least one of geometric information, texture information, vertex information, and shape information of the one or more geometric shapes.

The controller 1320 according to the exemplary embodiment may determine a repeated shape that represents a part of the one or more geometric shapes and repeated in the one or more geometric shapes.

The controller 1320 may determine the repeated shape in the one or more geometric shapes.

The controller 1320 may determine a repeated shape that is a partial shape corresponding to one or more geometric shapes and occurring twice or more, from among one or more partial shapes each representing a part of the one or more geometric shapes. The controller 1320 may determine a plurality of partial shapes configuring the one or more geometric shapes. From among the plurality of partial shapes, the controller 1320 may determine the partial shape corresponding to the one or more geometric shapes and occurring twice or more as the repeated shape.

The one or more geometric shapes according to the exemplary embodiment may include one or more user interface elements. For example, the one or more geometric shapes may include shapes of icon images. As another example, the one or more geometric shapes may include shapes of images configuring the user interface.

The acquisition unit 1310 according to the exemplary embodiment acquires information about the determined repeated shape, and acquires rendering information that represents the method of rendering one or more geometric shapes by using the information about the repeated shape.

The rendering information according to the exemplary embodiment may include information representing the method of rendering the one or more geometric shapes by using the information about the repeated shape. For example, the rendering information may include information indicating a location of the repeated shape in the one or more geometric shapes. As another example, the rendering information may include information about a method of transforming the repeated shape for rendering the one or more geometric shapes. The information about the method of transforming the repeated shape may include at least one of location information of the repeated shape used to render one or more geometric shapes, rotation information of the repeated shape, symmetric transformation information of the repeated shape, and scaling information of the repeated shape.

The acquisition unit 1310 may acquire information representing the determined repeated shape. For example, the acquisition unit 1310 may acquire at least one of the geometric information, texture information, vertex information, and shape information of the repeated shape determined by the controller 1320.

The controller 1320 according to the exemplary embodiment may render the one or more geometric shapes by using the information about the repeated shape. For example, the controller 1320 may render the one or more geometric shapes by using the texture information of the repeated shape. As another example, the controller 1320 may render the one or more geometric shapes by using the vertex information of the repeated shape, and may display the one or more geometric shapes.

The controller 1320 may use the rendering information while rendering the one or more geometric shapes by using the information about the repeated shape. For example, the controller 1320 may perform the rendering of the one or more geometric shapes by using the information about the repeated shape and the information about the location of the repeated shape. As another example, the controller 1320 may perform the rendering of the one or more geometric shapes by using the information about the repeated shape and the information about the transformation of the repeated shape.

The information about the repeated shape according to the exemplary embodiment may denote information representing the repeated geometric shape. For example, the information representing the repeated shape may include at least one of, for example but not limited to, geometric information, texture information, vertex information, shape information, color information, distance field information, and curve information of the repeated geometric shape. For example, the information representing one or more geometric shapes may include texture information of the geometric shape. As another example, the information representing one or more geometric shapes may include curve information indicating curved portions of the geometric shape. In addition, the information about the repeated shape may be acquired from the information representing the one or more geometric shapes.

In addition, the information about the repeated shape may be stored by using the lossy compression method or the lossless compression method. For example, the controller 1320 may perform the rendering of the one or more geometric shapes by acquiring information about the repeated shape, wherein the information about the repeated shape is stored in the lossy compression method or the lossless compression method. As another example, the controller 1320 may store the information about the repeated shape by using the lossy compression method or the lossless compression method, or may transmit the information to outside of the controller 1320.

The controller 1320 may perform the rendering of the one or more geometric shapes by using the information about the repeated shape and the rendering information.

The rendering information according to the exemplary embodiment may include information about a method of rendering the one or more geometric shapes by using the information about the repeated shape.

The controller 1320 may perform the rendering of the one or more geometric shapes by using the information about the repeated shape and the rendering information. For example, the controller 1320 may perform the rendering of the one or more geometric shapes by using the information about the repeated shape and the information about the location of the repeated shape. As another example, the controller 1320 may perform the rendering of the one or more geometric shapes by using the information about the repeated shape and the information about the transformation of the repeated shape.

The controller 1320 may store a rendering result in a storage medium. Here, the controller 1320 may store the rendering result in the lossy compression method or the lossless compression method in the storage medium.

Since the controller 1320 performs the rendering of the repeated shape by using the information about the repeated shape during rendering the one or more geometric shapes, a time taken to perform the rendering operation and the data processing amount during the rendering process may be reduced.

The controller 1320 according to the exemplary embodiment may determine whether there is one or more partial shapes that are similar to a first partial shape that is one of the partial shapes by a critical degree or greater from among the one or more partial shapes except for the first partial shape.

The controller 1320 according to the exemplary embodiment may determine a plurality of partial shapes configuring the one or more geometric shapes. In addition, the controller 1320 may determine the first partial shape that is one of the plurality of partial shapes. The controller 1320 may determine whether there is a partial shape corresponding to the first partial shape from among the plurality of partial shapes except for the first partial shape. For example, the controller 1320 may determine whether there is the partial shape that is similar to the first partial shape by a critical degree or greater from among the plurality of partial shapes. Here, the partial shape similar to the first partial shape by the critical degree or greater may be the partial shape corresponding to the first partial shape.

Whether the partial shape and the first partial shape are similar to each other by the critical degree or greater may be determined by using various methods. For example, the controller 1320 may determine whether the similarity between the partial shape and the first partial shape based on a similarity after performing scaling, rotating, and/or symmetric moving of the first partial shape. The operation of determining the similarity between the shapes may be performed using a method known in the art.

The controller 1320 may determine a second partial shape that is the partial shape similar to the first partial shape by the critical degree or greater according to the above determination result.

If there is the partial shape that is similar to the first partial shape by the critical degree or greater as a result of the determination, the controller 1320 may determine the partial shape similar to the first partial shape as the second partial shape from among the plurality of partial shapes. Here, the first and second partial shapes may be similar to each other by the critical degree or greater.

The controller 1320 determines the first and second partial shapes as the repeated shapes.

The controller 1320 may determine the first partial shape and/or the determined second partial shape as the repeated shape.

According to another exemplary embodiment, the controller 1320 may determine the first partial shape or the determined second partial shape as the repeated shape.

For example, if the controller 1320 determines that there is the second partial shape, the controller 1320 may determine the first partial shape as the repeated shape. In this case, the controller 1320 may not store information about the second partial shape. When the controller 1320 stores the information about the one or more geometric shapes, the controller 1320 may use only the information about the first partial shape, without using the information about the second partial shape. In this case, the information about the first partial shape may be used instead of the information about the second partial shape.

The display 1330 according to the exemplary embodiment may display a rendering result. Also, the display 1330 may display the one or more geometric shapes. In addition, the display 1330 may display a result of processing the graphic data.

The device 100 may include a display device that is used to display images.

The device 100 may be implemented in a mobile terminal (not shown). For example, the mobile phone may display a screen by using the rendering method illustrated above with reference to FIGS. 1 to 12. As another example, the mobile terminal may receive image data, and may process the image data by using the method illustrated with reference to FIGS. 1 to 12. As another example, a television may process graphic data by using the rendering method illustrated with reference to FIGS. 1 to 12. In this case, the television may display the processed graphic data.

The device 100 according to another exemplary embodiment may be implemented in a server (not shown). For example, when a server processes image data, the rendering method illustrated above with reference to FIGS. 1 to 12 may be used. As another example, the server may transmit image data processed according to the method illustrated with reference to FIGS. 1 to 12 to a terminal.

Figure 14:
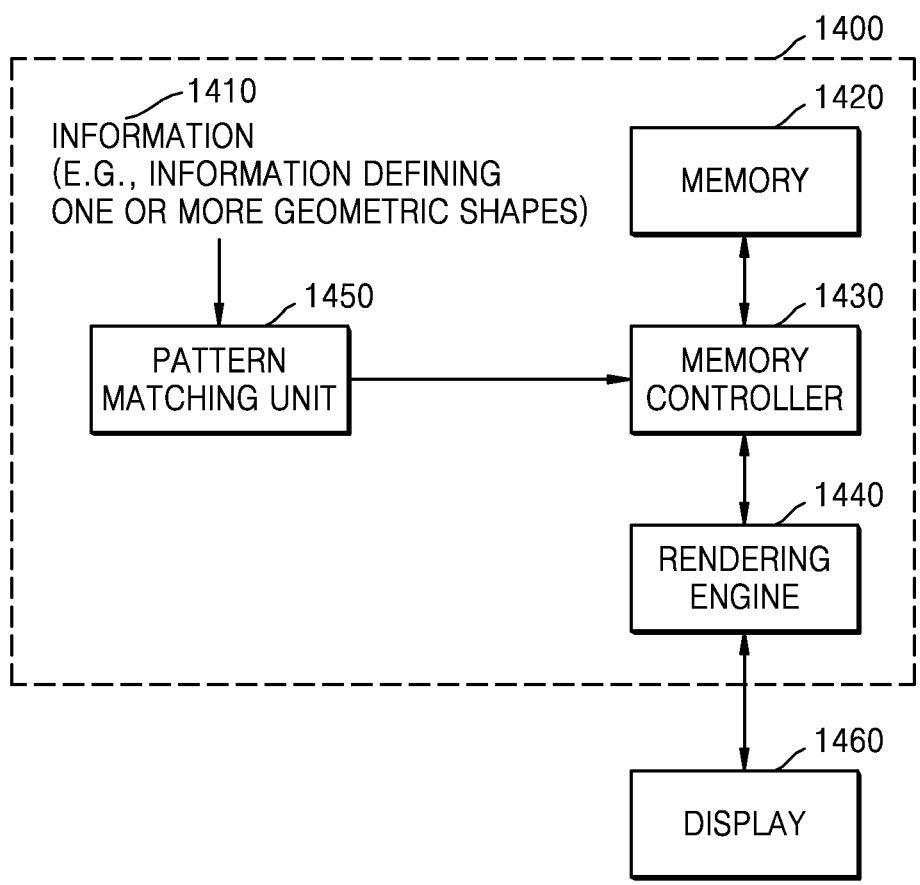
FIG. 14 is a block diagram of a system for processing an image according to an exemplary embodiment.

FIG. 14 is a block diagram of a system 1400 for processing an image according to an exemplary embodiment.

In FIG. 14, the system 1400 may include a memory 1420, a memory controller 1430, a pattern matching unit (or a pattern matcher) 1450, and a rendering engine 1440, but are not limited thereto. For example, the pattern matching unit 1450 and the rendering engine 1440 may be physically independent devices respectively including memories and memory controllers according to another exemplary embodiment. In the exemplary embodiment, information 1410 such as the pattern information and the geometric information may be shared by devices that are physically separate by using an appropriate data transfer method. In this manner, image data may be processed and rendered on and a display 1460.

According to the exemplary embodiment, the pattern information and the geometric information may be locally generated from a place where the geometric shape is rendered in the same device, or another location. For example, the pattern information and the geometric information for rendering a letter of a certain font may be generated and installed in advance in a user device such as a smartphone or a tablet computer. The pattern information and the geometric information may be installed in advance only with respect to the most common features. If the device needs to render another feature because the rendering information is not available, the device may locally generate the pattern information and the geometric information with respect to the new feature. In the exemplary embodiment, the device may add information to the existing pattern information and the geometric information to render a new geometric shape, by using texture information about the new geometric information. A part or entire part of the geometric shape that will be added may be compared with one or more previously identified patterns defined by the existing pattern information, to add the new geometric shape. If the part or the entire geometric shape of the new geometric shape is found in the patterns having the matched parts, the part or the entire geometric shape of the new geometric shape is identified to be rendered by using the existing pattern.

In addition, the new pattern does not need to be added to the pattern information. In this case, a new entry may be added to the existing geometric information to define how the new geometric shape or the part of the new geometric shape may be rendered by using the existing pattern.

As described above, the device 100 according to the exemplary embodiment may be applied to rendering elements in the user interface. For example, according to some exemplary embodiments, the geometric information and the pattern information may be used in a real-time rendering of the scalable text. The scalable text may be widely used in a current user interface. In particular, when a dynamic 3D motion element is used, the scalable text may be used in the current user interface. The pattern information and the geometric information may be used to render another user interface such as an icon or an image.

The device 100 according to the exemplary embodiment may generate information used in the rendering operation of one or more geometric shapes and may realize the method and a computer system for rendering geometric shapes based on the information used in the rendering operation of the one or more geometric shapes. The information defining one or more geometric shapes may be analyzed to identify one or more patterns including at least one repeated pattern from the information used in the rendering operation of the one or more geometric shapes. The pattern information defining one or more patterns and the geometric information defining how the one or more patterns are combined to render the one or more geometric shapes may be generated and stored. The pattern information and the geometric information may be used to render the geometric shapes. The geometric shape may define one or more transformations applied to the patterns to render the entire part of the geometric shape, and the pattern information may be stored by using the lossy compression or the lossless compression method.

The data processing method and device according to the exemplary embodiments may also be embodied as computer readable codes on a computer readable recording medium. The computer-readable recording medium is any data storage device that can store programs or data which can be thereafter read by a computer system. Examples of the computer readable recording medium include read-only memories (ROMs), random-access memories (RAMs), compact disk-read only memories (CD-ROMs), magnetic tapes, hard disks, floppy disks, flash memories, optical data storage devices, and so on. The media may also be a distributed network, so that the computer readable code is stored/transferred and executed in a distributed fashion.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A method of rendering an image in a display apparatus, the method comprising:
   acquiring information about a repeated shape that represents at least a part of one or more geometric shapes included in the image and repeatedly occurs in the one or more geometric shapes;
   acquiring rendering information representing a method of rendering the one or more geometric shapes based on the information about the repeated shape; and
   rendering the one or more geometric shapes based on the information about the repeated shape and the rendering information
   wherein a first partial shape and a second partial shape are determined as the repeated shape, among one or more partial shapes respectively representing parts of the one or more geometric shapes, in response to determining that there is an approximate matching or an exact matching between the first partial shape and the second partial shape, and
   wherein at least one of information about the first partial shape and information about the second partial shape is stored as the information about the repeated shape, by using a lossy compression method in response to determining that there is the approximate matching between the first partial shape and the second partial shape, and by using a lossless compression method in response to determining that there is the exact matching between the first partial shape and the second partial shape.

2. The method of claim 1, wherein the acquiring of the information about the repeated shape comprises determining the repeated shape from among the one or more partial shapes respectively representing the parts of the one or more geometric shapes, wherein the repeated shape comprises a partial shape corresponding to two or more parts of the one or more geometric shapes.

3. The method of claim 1, wherein the rendering information comprises information about a method of transforming the repeated shape to render the one or more geometric shapes.

4. The method of claim 3, wherein the information about the method of transforming the repeated shape comprises at least one from among location information of the repeated shape, rotation information of the repeated shape, symmetric transformation information of the repeated shape, and scaling information of the repeated shape.

5. The method of claim 1, further comprising acquiring information representing the one or more geometric shapes,
wherein the information representing the one or more geometric shapes comprises at least one from among texture information that is used to acquire a cubic image, and vertex information that is information about a point at which two or more lines defining the one or more geometric shapes intersect each other, and
wherein the information about the repeated shape is acquired from the information representing the one or more geometric shapes.

6. The method of claim 1, further comprising acquiring information representing the one or more geometric shapes,
wherein the information representing the one or more geometric shapes comprises at least one from among color information of the one or more geometric shapes, distance field information indicating a distribution of points defining the one or more geometric shapes, and curve information indicating at least one curve defining the one or more geometric shapes, and
wherein the information about the repeated shape is acquired from the information representing the one or more geometric shapes.

7. The method of claim 1, wherein the one or more geometric shapes comprise one or more user interface elements of the display apparatus.

8. A non-transitory computer-readable medium having recorded thereon a program, which, when executed by a computer, performs the method of claim 1.

9. A method of acquiring information for rendering an image in a display apparatus, the method comprising:
acquiring information representing one or more geometric shapes included in the image;
acquiring, from the acquired information, information about a repeated shape that represents at least a part of the one or more geometric shapes and repeatedly occurs in the one or more geometric shapes; and
acquiring rendering information that represents a method of rendering the one or more geometric shapes based on the information about the repeated shape, wherein the one or more geometric shapes are rendered based on the information about the repeated shape and the rendering information;
wherein a first partial shape and a second partial shape are determined as the repeated shape, among one or more partial shapes respectively representing parts of the one or more geometric shapes, in response to determining that there is an approximate matching or an exact matching between the first partial shape and the second partial shape, and
wherein at least one of information about the first partial shape and information about the second partial shape is stored as the information about the repeated shape, by using a lossy compression method in response to determining that there is the approximate matching between the first partial shape and the second partial shape, and by using a lossless compression method in response to determining that there is the exact matching between the first partial shape and the second partial shape.

10. A display apparatus for rendering an image, the display apparatus comprising:
a memory storing instructions; and
at least one processor configured to execute the instructions to:
acquire information about a repeated shape that represents at least a part of one or more geometric shapes included in the image and repeatedly occurs in the one or more geometric shapes;
acquire rendering information that represents a method of rendering the one or more geometric shapes based on the information about the repeated shape; and
render the one or more geometric shapes based on the information about the repeated shape and the rendering information,
wherein the at least one processor is further configured to execute the instructions to determine a first partial shape and a second partial shape as the repeated shape, among one or more partial shapes respectively representing parts of the one or more geometric shapes, in response to determining that there is an approximate matching or an exact matching between the first partial shape and the second partial shape, and
wherein the memory is further configured to store at least one of information about the first partial shape and information about the second partial shape as the information about the repeated shape, by using a lossy compression method in response to determining that there is the approximate matching between the first partial shape and the second partial shape, and by using a lossless compression method in response to determining that there is the exact matching between the first partial shape and the second partial shape.

11. The display apparatus of claim 10, wherein the repeated shape comprises a partial shape corresponding to two or more parts of the one or more geometric shapes from among the one or more partial shapes respectively representing the parts of the one or more geometric shapes.

12. The display apparatus of claim 10, wherein the rendering information comprises information about a method of transforming the repeated shape to render the one or more geometric shapes.

13. The display apparatus of claim 12, wherein the information about the method of transforming the repeated shape comprises at least one from among location information of the repeated shape, rotation information of the repeated shape, symmetric transformation information of the repeated shape, and scaling information of the repeated shape.

14. The display apparatus of claim 10, wherein the at least one processor is further configured to execute the instructions to acquire information representing the one or more geometric shapes, and
wherein the information representing the one or more geometric shapes comprises at least one from among texture information that is used to acquire a cubic image, and vertex information that is information about a point at which two or more lines defining the one or more geometric shapes intersect each other, color information of the one or more geometric shapes, distance field information indicating a distribution of points defining the one or more geometric shapes, and curve information indicating at least one curve defining the one or more geometric shapes, and wherein the information about the repeated shape is acquired from the information representing the one or more geometric shapes.

15. The display apparatus of claim 10, further comprising a display configured to display a rendering result.

16. A display apparatus for acquiring information for rendering an image, the display apparatus comprising:
a memory storing instructions; and
at least one processor configured to execute the instructions to:
acquire information representing one or more geometric shapes included in the image;
acquire, from the acquired information, information about a repeated shape that represents at least a part of the one or more geometric shapes and repeatedly occurs in the one or more geometric shapes; and
acquire rendering information that represents a method of rendering the one or more geometric shapes based on the information about the repeated shape, wherein the one or more geometric shapes are rendered based on the information about the repeated shape and the rendering information, wherein the at least one processor is further configured to execute the instructions to determine a first partial shape and a second partial shape as the repeated shape, among one or more partial shapes respectively representing parts of the one or more geometric shapes, in response to determining that there is an approximate matching or an exact matching between the first partial shape and the second partial shape, and wherein the memory is further configured to store at least one of information about the first partial shape and information about the second partial shape as the information about the repeated shape, by using a lossy compression method in response to determining that there is the approximate matching between the first partial shape and the second partial shape, and by using a lossless compression method in response to determining that there is the exact matching between the first partial shape and the second partial shape.

* * * * *